(12) United States Patent
Halasa et al.

(10) Patent No.: US 8,071,689 B2
(45) Date of Patent: Dec. 6, 2011

(54) METHODS OF MAKING SILOXY-AMINE FUNCTIONALIZED RUBBERY POLYMERS AND USES THEREOF IN RUBBER COMPOSITIONS FOR TIRES

(75) Inventors: Adel Farhan Halasa, Bath, OH (US); Nicola Constantini, Luxembourg (LU); Frank Schmitz, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 592 days.

(21) Appl. No.: 12/207,736

(22) Filed: Sep. 10, 2008

(65) Prior Publication Data

US 2010/0063202 A1    Mar. 11, 2010

(51) Int. Cl.
     *C08C 19/22*      (2006.01)
(52) U.S. Cl. ......... 525/374; 525/342; 524/492; 524/495
(58) Field of Classification Search .................. 525/342, 525/374; 524/492, 495, 572, 104
See application file for complete search history.

(56) References Cited

U.S. PATENT DOCUMENTS

| | | |
|---|---|---|
| 4,102,841 A | 7/1978 | Antlfinger et al. |
| 4,147,712 A | 4/1979 | Williams et al. |
| 4,978,463 A | 12/1990 | Satoji |
| 5,561,210 A | 10/1996 | Roy |
| 5,811,479 A * | 9/1998 | Labauze ........................ 524/188 |
| 6,586,501 B1 | 7/2003 | Dalton et al. |
| 6,889,735 B2 | 5/2005 | Frank et al. |
| 7,202,306 B2 * | 4/2007 | Tanaka et al. ............... 525/331.9 |
| 2002/0068796 A1 | 6/2002 | Frank et al. |
| 2004/0020576 A1 | 2/2004 | Frank et al. |
| 2008/0027162 A1 | 1/2008 | Hua et al. |

FOREIGN PATENT DOCUMENTS

EP      1 022 291 A1 *    7/2000

* cited by examiner

*Primary Examiner* — Ling Choi
(74) *Attorney, Agent, or Firm* — Wood, Herron & Evans, LLP

(57) ABSTRACT

The invention includes a siloxy-amine functionalized rubbery polymer, which exhibits good reinforcing characteristics and filler dispersing effect, a method for making, and a rubber composition including the same. In one embodiment, a process for manufacturing includes polymerizing a conjugated diene monomer using an organolithium compound as an initiator in a hydrocarbon solvent. Next, an active terminal end of the polymer is reacted with a functionalized terminating agent represented by:

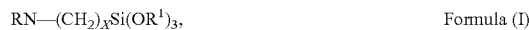

$$RN-(CH_2)_x Si(OR^1)_3, \quad \text{Formula (I)}$$

wherein R, in combination with the nitrogen (N) atom, is a substituted or unsubstituted heterocyclic aromatic or non-aromatic compound which includes a ring structure with one or more nitrogen atoms as part of the ring; $R^1$ represents a group having 1 to 18 carbon atoms selected from an alkyl, a cycloalkyl, an allyl, or an aryl; and X is an integer from 1 to 20.

8 Claims, No Drawings

METHODS OF MAKING SILOXY-AMINE FUNCTIONALIZED RUBBERY POLYMERS AND USES THEREOF IN RUBBER COMPOSITIONS FOR TIRES

TECHNICAL FIELD

The present invention is directed to methods of making siloxy-amine functionalized rubbery polymers and uses thereof in rubber compositions for tires.

BACKGROUND

It is sometimes desirable for tires to have a combination of good wet skid resistance, low rolling resistance, tear strength, and good wear characteristics. Wear characteristics of a tire tread are often difficult to improve without sacrificing traction and/or rolling resistance. In one aspect, such properties depend upon dynamic viscoelastic properties of the tire tread rubber composition and the rubbery polymers utilized in the rubber composition.

In order to reduce the rolling resistance and to improve the tread wear characteristics of tires, rubbers or rubbery polymers having a high rebound physical property (low hysteresis) have often been used for the tire tread rubber compositions. However, in order to increase the wet skid resistance of a tire tread, rubbery polymers that have a relatively lower rebound physical property (higher hysteresis) which thereby undergo a greater energy loss have sometimes been used for such tread rubber compositions. In order to achieve such relatively inconsistent viscoelastic properties for the tire tread rubber compositions, blends (mixtures) of various types of synthetic and natural rubbers are normally utilized in tire treads.

It is often desirable for synthetic rubber polymers to exhibit relatively low levels of hysteresis (indicated by relatively higher rebound values). This is usually particularly important in the case of elastomers that are used in tire tread rubber compositions. In practice, the elastomers are conventionally blended with a sulfur curative, rubber reinforcing fillers such as, for example, precipitated silica and rubber reinforcing carbon black, sulfur vulcanization accelerators, rubber antidegradants and other desired rubber chemicals and are then subsequently vulcanized, or cured, under pressure at an elevated temperature in a suitable mold. The physical properties of such cured rubber compositions depend upon the degree to which the rubber reinforcing fillers, such as carbon black or silica, are homogeneously dispersed throughout the elastomer. The degree of homogeneity of the dispersement of the reinforcing filler relates, at least in part, to the degree of affinity that carbon black or silica for the rubbery polymer.

Amorphous silica reinforcement has sometimes been used in combination with rubber reinforcing carbon black to promote lower rolling resistance (e.g. better vehicular fuel economy) and to promote better traction (e.g. skid and braking resistance) for a tire tread rubber composition. However, use of such silica reinforcement filler, as compared to rubber reinforcing carbon black, often results in a decrease in wear resistance (e.g. increase in tread wear) of a tire tread rubber composition.

Accordingly, it is envisioned that use of a combination amorphous silica (e.g. precipitated silica) and rubber reinforcing carbon black might be used to balance the challenges of promoting reduced tread wear (e.g. increased abrasion resistance of the rubber composition), reduced tire rolling resistance (e.g. increased rebound values of the rubber composition) as well as promoting traction for the tire tread instead of using carbon black or silica separately as reinforcing filler.

In one aspect, terminal modified or functionalized elastomers, which promote an interaction with a wide variety of such silica and carbon black reinforcing fillers to promote good dispersibility of such reinforcing fillers within the rubber composition, and thereby suitable wear resistance (e.g. suitable abrasion resistance) of the rubber composition, might be used.

Accordingly, functionalized rubber polymers (elastomers) and methods of making same for use in rubber compositions, such as for use in tires, are needed.

SUMMARY OF THE INVENTION

The invention includes a siloxy-amine functionalized rubbery polymer, which exhibits good reinforcing characteristics and filler dispersing effect, a method for making the siloxy-amine functionalized polymer, and a rubber composition comprising the siloxy-amine functionalized polymer having good fracture characteristics, wear resistance, and low exothermicity, without the impairment of the wet performance. Such effects can be accomplished by affecting the interactions of the siloxy-amine functionalized polymer with rubber reinforcing silica.

Siloxy-amine functionalized rubbery polymers can be prepared by polymerizing a conjugated diene monomer using an organolithium compound as an initiator in a hydrocarbon solvent, followed by reacting an active terminal of the resulting polymer with a functionalized terminating agent, bearing a siloxy group and a tertiary amino group, which is defined by a cyclic amine. The functionalized terminating agent has a structure according to the general formula:

  Formula (I)

wherein R, in combination with the nitrogen (N) atom, is a substituted or unsubstituted heterocyclic aromatic compound which includes a ring structure with one or more nitrogen atoms as part of the ring, or a substituted or unsubstituted heterocyclic non-aromatic compound which includes a ring structure with one or more nitrogen atoms as part of the ring; $R^1$ represents a group having 1 to 18 carbon atoms selected from an alkyl, a cycloalkyl, an allyl, or an aryl; and X is an integer from 1 to 20. In one example, at least one $R^1$ group is an ethyl radical.

The functionalized rubbery polymer can be used in a rubber compound that includes 10 to 130 parts by weight rubber reinforcing filler and 100 parts by weight rubbery polymer (elastomer), with at least 25% by weight of the rubbery polymer being the siloxy-amine functionalized rubbery polymer. In yet another embodiment, a tire has a component (e.g. a tire tread) that includes the aforementioned rubber compound, with at least 25% to 100% by weight of the rubbery polymer being a siloxy-amine functionalized rubbery polymer.

DETAILED DESCRIPTION OF THE INVENTION

In accordance with an embodiment of the invention, a siloxy-amine functionalized rubbery polymer is obtained by polymerizing a conjugated diene monomer using an organolithium compound as an initiator in a hydrocarbon solvent. And thereafter, an active terminal of the resulting polymer is allowed to react with a functionalized terminating agent bearing a siloxy group and a tertiary cyclic amine group. The functionalized terminating agent may be represented by the general formula:

  Formula (I)

wherein R, in combination with the nitrogen (N) atom, may be a substituted or unsubstituted heterocyclic aromatic compound which includes a ring structure with one or more nitrogen atoms as part of the ring, or a substituted or unsubstituted heterocyclic non-aromatic compound which includes a ring structure with one or more nitrogen atoms as part of the ring; $R^1$ represents a group having 1 to 18 carbon atoms selected from an alkyl, a cycloalkyl, an allyl, or an aryl; and X is an integer from 1 to 20.

In one embodiment, R is a substituted or unsubstituted heterocyclic aromatic compound that includes the ring structure with one or more nitrogen atoms as part of the ring. In one example, the heterocyclic aromatic compound is a substituted or unsubstituted 3-, 4-, 5-, 6-, or 7-membered ring structure with one or more nitrogen atoms as part of the ring. The heterocyclic aromatic compound can be 2,5-methylpyrrole, pyrrole, quinoline, pyridine, and the like. The heterocyclic aromatic compound can be 2,5-methylpyrrole, x is 3, and R is ethyl. In another example, at least one $R^1$ group is an ethyl radical.

In another embodiment, R is a substituted or unsubstituted heterocyclic non-aromatic compound that includes the ring structure with one or more nitrogen atoms as part of the ring. The heterocyclic non-aromatic compound can be a substituted or unsubstituted 3-, 4-, 5-, 6-, or 7-membered ring structures with one or more nitrogen atoms as part of the ring. The heterocyclic non-aromatic compound can be pyrrole, piperazine, pyrolidine, piperidine, hexamethyleneimine, and the like. In another example, at least one $R^1$ group is an ethyl radical. Other examples may be contemplated by one having ordinary skilled in the art.

The siloxy amine functionalized terminating agent may be synthesized by methods known in the art. For example, as illustrated in Scheme 1 below, condensation of an amino silane (1) with an excess of acetonylacetone (2) may be performed utilizing a Dean-Stark trap for azeotropic water removal leading to functionalized siloxy-amine (3) in accordance with the invention. See Macor et al., J. Org. Chem., 1994, 59, 7498, which is expressly incorporated by reference herein in its entirety.

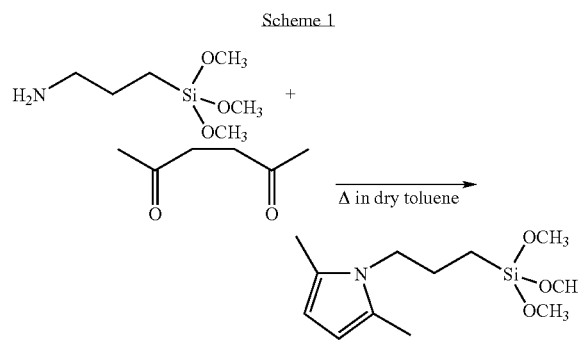

The resulting functionalized terminating agent, which includes a siloxy group and a tertiary cyclic amino group, is utilized to manufacture the siloxy-amine functionalized rubbery polymer. As indicated above, that process includes preparing the functionalized rubbery polymer by (co)polymerizing a conjugated diene monomer optionally with a vinyl aromatic using an organolithium compound as an initiator in a hydrocarbon solvent to form, e.g., styrene buatadiene rubber (SBR), followed by reacting an active terminal end of the resulting polymer with the functionalized terminating agent. When the functionalized terminating agent reacts with the active terminal end of the polymer, an alkoxy group (OR) is lost from the siloxy group to allow for attachment of the polymer thereto. It should be understood that more than one polymer may react with the functionalized terminating agent thereby displacing one or more alkoxy groups. The resulting siloxy-amine functionalized polymer may be generally represented by the following:

$RN$—$(CH_2)_X Si(OR^1)_y$-rubbery polymer, where the variables are as defined as above with Y being from 0 to 2, and where the rubbery polymer may be styrene-butadiene rubber (SBR), for example, wherein one or more butadiene units may be attached to the silicon moiety. In one specific example, RN is 2,5-methylpyrrole, x is 3, R is ethyl, y is 2, and the rubbery polymer is SBR.

The amount of the functionalized terminating agent used in functionalizing the rubbery polymer may be about 0.25 to 5.0 mol per one mole of the organo-alkali metal compound, which is used as an initiator for polymerization. More particularly, the amount of functionalized terminating agent may be, for example, about 0.5 to 1.5 mol per one mole of the organo-alkali metal compound.

Examples of the conjugated diene monomer include 1,3-butadiene, isoprene, 1,3-pentadiene, 2,3-dimethylbutadiene, 2-phenyl-1,3-butadiene, and 1,3-hexadiene. The conjugated diene monomer may be a homopolymer or a copolymer. Copolymerization can be with another conjugated diene monomer or a vinyl aromatic monomer, for example. Vinyl aromatic hydrocarbon monomers for use in copolymerization with the conjugated diene monomer include styrene, a-methylstyrene, 1-vinylnaphthalene, 3-vinyltoluene, ethylvinylbenzene, divinylbenzene, 4-cyclohexylstyrene, and 2,4,6-trimethylstyrene.

When carrying out copolymerization using a conjugated diene monomer and a vinyl aromatic hydrocarbon monomer, the monomers, in one example, are 1,3-butadiene and styrene, respectively. From a practical standpoint, these monomers are readily available and have desirable anionic polymerization properties, including living properties.

Examples of the initiator for use in the polymerization reaction include organolithium compounds. The lithium compounds may have 2 to 20 carbon atoms. Specific examples include ethyllithium, n-propyllithium, i-propyllithium, n-butyllithium, secbutyllithium, t-octyllithium, n-decyllithium, phenyllithium, 2-naphthyllithium, 2-butylphenyllithium, 4-phenyl-butyllithium, cyclohexyllithium, 4-cyclopentyllithium, and a reaction product between diisopropenylbenzene and butyllithium. The amount of initiator used includes about 0.1 to 20 mmol based on 100 g of monomers.

The polymerization process is carried out in a solvent, such as a hydrocarbon solvent, that does not destroy the organolithium initiator. Suitable solvents include aliphatic hydrocarbons, aromatic hydrocarbons, or alicyclic hydrocarbons. Suitable hydrocarbons may have 3 to 8 carbon atoms. Examples of the hydrocarbon include propane, n-butane, i-butane, n-pentane, i-pentane, n-hexane, mixed hexanes, cyclohexane, propene, 1-butene, i-butene, trans-2-butene, cis-2-butene, 1-pentene, 2-pentene, 1-hexene, 2-hexene, benzene, toluene, xylene, and ethylbenzene. These solvents may be used alone or in combination. From a practical standpoint, mixed hexanes, cyclohexane, and pentane are readily available and have desirable anionic polymerization solvent properties.

The monomer concentration in the solvent may be for example about 5 to 50% by weight and more particularly about 10 to 30% by weight. When carrying out copolymerization between a conjugated diene monomer and a vinyl aromatic hydrocarbon monomer, the content of the vinyl aromatic hydrocarbon monomer in the monomer mixture charged into a reactor may be for example about 3 to 50% by weight. In another example, the content is about 5 to 45% by weight.

A modifier may be used when anionic polymerization of a conjugated diene monomer is carried out. The term "modifier" is used herein to mean a compound that has a function to control the microstructure of a conjugated diene polymer and the compositional distribution of monomer units in a copolymer composed of a conjugated diene monomer and a vinyl aromatic hydrocarbon monomer. For example, the increase of the proportion of 1,2-linkage of butadiene portions of a butadiene polymer or in a butadiene portion of a butadiene-styrene copolymer, or the increase of the proportion of the 3,4-linkage of an isoprene polymer can be controlled. In addition, randomization of butadiene units or the styrene units in a butadiene-styrene copolymer, for example, can be controlled. The modifiers are not particularly limited. Examples of the modifiers include ethers such as dimethoxybenzene, tetrahydrofuran, dimethoxyethane, diethylene glycol dibutyl ether, diethylene glycol dimethyl ether, bis(tetrahydrofurylpropane), and tertiary amines such as trimethylamine, pyridine, N-methylmorpholine, N,N,N',N'-tetramethylethylenediamine, and 1,2-dipiperidinoethane. Further examples include potassium salts such as potassium-t-amylate and potassium-t-butoxide and sodium salts such as sodium-t-amylate. The amount to be used of the modifier is within the range of from 0.01 to 10 molar equivalents per one mole of the organolithium compound.

The reaction between the functionalized terminating agent and the polymerized or copolymerized monomer can be carried out utilizing standard temperatures for diene polymerization. Such temperatures can range from 30° C. to 110° C., for example. The polymerization reaction can be carried under a pressure generated by the reaction. It is normally desirable to carry out the reaction under a pressure sufficient to keep the monomers substantially in a liquid phase. That is, the pressure for the polymerization reaction depends on the substances to be polymerized, diluents to be used, and polymerization temperatures, and a higher pressure can be employed if desired. Such a pressure can be obtained by an appropriate method, for example, such as by pressurizing the reactor by a gas inert to the polymerization reaction.

Generally, it is desirable to remove water, oxygen, carbon dioxide, and other catalyst poison from all of the materials, such as initiator, solvent, monomer, and the like, involved in the polymerization process.

Although the timing and method for adding the functionalized terminating agent, which contains the combination of alkoxy and tertiary amino groups, to the polymerization system chain is not particularly limited, generally such a terminating agent is added when the polymerization is completed or near completion. In other words, the polymerization is normally carried out until high conversions of at least about 85 percent are attained. For instance, the functionalized terminating agent, which contains the combination of alkoxy and tertiary amino groups, will normally be added only after a monomer conversion (conversion to the elastomer) of greater than about 85 percent has been realized.

Generally, the siloxy-amine functionalized rubbery polymer or copolymer obtained will have, for example, a glass transition point (Tg) of −95 to −10° C. as measured by DSC (Differential Scanning Calorimetry) using a heating rate of 10° C./min.

The Mooney viscosity ($ML_{1+4}/100°$ C.) of the uncured siloxy-amine functionalized rubber polymer may, for example, be in a range of from about 10 to about 150, more particularly, from about 15 to about 70.

The siloxy-imine functionalized rubbery polymer can be used together with conventional rubbery polymers to provide a rubber composition for use in the tire industry. The amino group of the functionalized rubbery polymer can hydrogen bond with a variety of acidic functional groups. And, the siloxy group can undergo a condensation reaction with the silanol group on the surface of silica and is susceptible to nucleophilic substitution at the silicon. The synergism of this condensation reaction and the force of the hydrogen bond by the amino group can provide a highly desirable reinforcing effect. As such, the resulting functional elastomer has a desirable reactivity towards silica.

The functionalized rubbery polymer is typically blended with conventional rubber polymers. Examples of conventional rubbery polymers include natural rubber and diene-based synthetic rubbers. Examples of the diene-based synthetic rubbers include emulsion styrene/butadiene copolymers, solution styrene/butadiene copolymers, 1,4-cis-polybutadiene, 1,2-vinyl-polybutadiene, 1,4-cis-polyisoprene, 3,4-polyisoprene, styrene/isoprene/butadiene copolymers, isoprene/butadiene copolymers, styrene/isoprene copolymers, butyl rubber, ethylene/propylene copolymers, and blends thereof. A rubber component, having a branched structure formed by use of a polyfunctional modifier such as tin tetrachloride, or a multifunctional monomer such as divinyl benzene may also be used.

The rubber composition, which includes at least about 25% to 100% by weight siloxy-amine functionalized rubbery polymer, with about 50% to about 75% weight percent being preferred, also can include rubber reinforcing carbon black or rubber reinforcing silica, or both as reinforcing fillers. Clay and/or organic fillers such as starch can also be used as rubber reinforcing fillers.

The silica for use in the present invention may be a synthetic amorphous rubber reinforcing silica. Examples include wet-process silica (precipitated silica), dry-process silica (fumed silica), calcium silicate, and aluminum silicate. In one example, the silica is precipitated silica. Examples of various rubber reinforcing carbon blacks may be found, for example, the Vanderbilt Rubber Handbook, 13$^{th}$ Edition (1990) pages 416 through 418. The amount of the rubber reinforcing filler used in the rubber composition can be, for example, within a range of from about 10 to about 130 phr (e.g. in a range of from about 20 to about 110 phr).

When synthetic amorphous silica (e.g. precipitated silica) is used as filler in the rubber composition, a silica coupling agent can be used to further increase the reinforcing property at the time when the silica is incorporated. Such silica coupling agents have a moiety reactive with hydroxyl groups (e.g. silanol groups), on the silica filler and another different moiety interactive with the conjugated diene derived elastomer. Representative examples include organoalkoxymercapto silanes and bis(3-trialkoxysilylalkyl)polysulfides having an average of about 2 to 4 connecting sulfur atoms in its polysulfidic bridge. Examples of the silica coupling agent comprise, for example, bis(3-triethoxysilylpropyl)tetrasulfide, bis(3-triethoxysilylpropyl)disulfide, bis(2-triethoxysilylethyl)tetrasulfide, bis(3-triethoxysilylpropyl)tetrasulfide, bis(2-trimeth-oxysilylethyl)tetrasulfide, 3-mercaptopropyltrimethoxysilane, 3-mercaptopropyl-triethoxysilane, 2-mercaptoethyltrimethoxysilane, 2-mercaptoethyltriethoxysilane, 3-nitropropyltrimethoxysilane, 3-nitropropyl-triethoxysilane, 3-chloropropyltrimethoxysilane, 3-chloropropyltriethoxysilane, 2-chloroethyltrimethoxy-silane, 2-chloroethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxy-silylethyl-N,N-dimethylthiocarbamoyl tetrasulfide, 3-trimethoxysilylpropylbenzothiazole tetrasulfide, 3-triethoxysilyl-propylbenzothiazole tetrasulfide, 3-triethoxysilylpropyl-methacylate monosulfide, 3-trimethoxysilylpropylmethacylate monosulfide, bis(3-diethoxymethylsilylpropyl)tetrasulfide, 3-mercaptopropyldimethoxymethylsilane, 3-nitropropyldimethoxymethylsilane, 3-chloropropyldimethoxymethylsilane, dimethoxymethylsilylpropyl-N,N-dimethyl-thiocarbamoyl tetrasulfide, and dimethoxymethylsilylpropylbenzothiazole tetrasulfide.

The siloxy-amine functionalized rubbery polymer with its functionalized terminating agent, as defined by formula I, has a high affinity for silica. Therefore, even when the content of silica coupling agent, which is expensive, in the rubber composition is lower than a conventional content, the use of the functionalized rubbery polymer enables the rubber composition to exhibit physical properties competitive with those of conventional ones. Although the amount of silica reinforcement may vary, depending somewhat on the kind of the silica coupling agent, the amount of silica coupling agent may be, for example, in a range of from about 1 to about 20 weight percent based on the amount of the silica. In one example, the amount of silica coupling agent may be, for example, in a range of from about 5 to about 15 weight percent based on the amount of the silica.

Examples of vulcanizing agents include sulfur and sulfur containing compounds. The amount of the vulcanizing agent to be used may be for example 0.1 to 10.0 phr. For example, the amount may be between 1.0 to 5.0 phr.

Examples of the process oil include for example paraffin-based oils, naphthene-based oils, and aromatic-based oils. The amount to be used of the process oil may be, for example, between 0 to 100 phr.

The vulcanization accelerators may include for example thiazole-based ones, such as 2-mercaptobenzothiazole, dibenzothiazyl disulfide, and sulphenamides such as for example N-cyclohexyl-2-benzothiazyl sulphenamide, and guanidine-based ones such as for example diphenylguanidine. The amount to be used of the vulcanization accelerator may be, for example, 0.1 to 5.0 phr. More typical the amount may be, for example, between 0.2 to 3.0 phr.

The rubber composition of the present invention may also typically contain additives that are conventionally used in rubber industries, for example, are antioxidants, zinc oxide, stearic acid, waxes and antidegradients.

The rubber composition may be obtained by milling the ingredients using a kneading apparatus such as a roll mill, an internal mixer, and the like. After being shaped, the rubber composition is vulcanized. The rubber composition can be used in various tire components, such as tire treads, under treads, carcasses, sidewalls, and beads, and in other industrial applications such as rubber cushions, belts, and hoses, for example. In one example, the rubber composition is suitable as a rubber composition for tire treads.

As described above, the siloxy-amine functionalized rubbery polymer exhibits good reinforcing characteristics in a rubber composition having a filler which includes amorphous silica and/or rubber reinforcing carbon black.

In order to further illustrate the present invention, the following specific examples illustrating the preparation of styrene-butadiene rubber terminated with a siloxy amine functionalized terminating agent of Formula (I) are given. It should be understood that the examples are not limitations of the scope of the present invention.

EXAMPLE 1

2000 g hexane solution containing 20% styrene monomer and 80% butadiene monomer was charged in a one gallon reactor equipped with air stirrer nitrogen inlet and water cooled coil. This solution was catalyzed with 0.30 mmoles of n-butyl lithium and 0.6 mmoles of tetramethylethylenediamine (TMEDA). The reactor temperature was raised to 65° C. and the reaction was allowed to 100% completion. The resulting polymer had a Tg of −25° C. and a molecular weight of 250,000. At this stage, the polymer was functionalized with 3-(2,5-dimethylpyrrole)propyltriethoxysilane containing the reactive groups in 1:1 ratios to the chain end concentration that will react with active lithium chain ends (3-(2,5-dimethylpyrrole)propyltriethoxysilane/Li=1).

EXAMPLE 2

The same procedure was followed as in Example I except that the resulting polymer was functionalized with 3-piperidinopropyltriethoxysilane.

EXAMPLE 3

The same procedure was followed as in Example I except that the resulting polymer was functionalized with 3-pyrrolidinopropyltriethoxysilane.

EXAMPLE 4

The same procedure was followed as in Example I except that the resulting polymer was functionalized with 3-pyridinopropyltriethoxysilane.

EXAMPLE 5

The same procedure was followed as in Example I except that the resulting polymer was functionalized with 3-hexamethyliminopropyltriethoxysilane.

Each of the resulting siloxy-amine functionalized styrene-butadiene rubbery (SBR) polymers was compounded in a standard tread recipe and evaluated against a non-functionalized solution SBR of the same molecular weight and glass-transition temperature. The functionalized compounds yielded superior tan delta values of about 0.112 as compared the control tan delta of 0.167. These tan delta values illustrate that the siloxy-amine functionalized SBR provides better filler polymer interaction.

While the present invention has been illustrated by the description of one or more embodiments thereof, and while the embodiments have been described in detail, they are not intended to restrict or in any way limit the scope of the appended claims to such detail. Additional advantages and modifications will readily appear to those skilled in the art. The invention in its broader aspects is therefore not limited to the specific details, representative methods and illustrative examples shown and described. Accordingly, departures may be made from such details without departing from the scope of the general inventive concept.

What is claimed is:

1. A process for manufacturing a siloxy-amine functionalized rubbery polymer comprising:
    polymerizing a conjugated diene monomer to form a polymer by using an organolithium compound as an initiator in a hydrocarbon solvent; and
    subsequently, reacting an active terminal end of the polymer with a functionalized terminating agent represented by the general formula:

RN—(CH$_2$)$_x$Si(OR$^1$)$_3$, wherein R, in combination with the nitrogen (N) atom, is a substituted or unsubstituted heterocyclic aromatic compound which includes a ring structure with one nitrogen atom as part of the ring, wherein the heterocyclic aromatic compound is 2,5-methylpyrrole, pyrrole, quinoline, or pyridine; R$^1$ represents a group having 1 to 18 carbon atoms selected from an alkyl, a cycloalkyl, an allyl, or an aryl; and X is an integer from 1 to 20.

2. The process according to claim 1, wherein polymerizing a conjugated diene monomer to form a polymer comprises copolymerizing a conjugated diene monomer and a monovinyl aromatic monomer to form a copolymer.

3. The process according to claim 2, wherein polymerizing a conjugated diene monomer to form a polymer comprises copolymerizing butadiene and styrene to form the copolymer.

4. The process according to claim 1, wherein the heterocyclic aromatic compound is 2,5-methylpyrrole, x is 3, and R is ethyl.

5. A siloxy-amine functionalized rubbery polymer comprising:
    at least one conjugated diene monomer; and
    a functionalized terminating agent comprised of the general formula:

RN—(CH$_2$)$_x$Si(OR$^1$)$_3$, wherein R, in combination with the nitrogen (N) atom, is a substituted or unsubstituted heterocyclic aromatic compound which includes a ring structure with one nitrogen atom as part of the ring, wherein the heterocyclic aromatic compound is 2,5-methylpyrrole, pyrrole, quinoline, or pyridine; R$^1$ represents a group having 1 to 18 carbon atoms selected from an alkyl, a cycloalkyl, an allyl, or an aryl; and X is an integer from 1 to 20.

6. The siloxy-amine functionalized rubbery polymer according to claim 5, wherein the heterocyclic aromatic compound is 2,5-methylpyrrole, x is 3, and R is ethyl.

7. A rubber compound comprising:
    100 parts by weight of a rubbery polymer, at least 25% to 100% by weight of the rubbery polymer is a siloxy-amine functionalized rubbery polymer comprised of a functionalized terminating agent represented by the general formula:

RN—(CH$_2$)$_x$Si(OR$^1$)$_3$, wherein R, in combination with the nitrogen (N) atom, is a substituted or unsubstituted heterocyclic aromatic compound which includes a ring structure with one nitrogen atom as part of the ring, wherein the heterocyclic aromatic compound is 2,5-methylpyrrole, pyrrole, quinoline, or pyridine; R$^1$ represents a group having 1 to 18 carbon atoms selected from an alkyl, a cycloalkyl, an allyl, or an aryl; and X is an integer from 1 to 20; and 10 to 130 parts by weight of a rubber reinforcing filler.

8. A tire having a component comprised of the rubber compound of claim 7.

* * * * *

UNITED STATES PATENT AND TRADEMARK OFFICE
CERTIFICATE OF CORRECTION

| | | |
|---|---|---|
| PATENT NO. | : 8,071,689 B2 | Page 1 of 1 |
| APPLICATION NO. | : 12/207736 | |
| DATED | : December 6, 2011 | |
| INVENTOR(S) | : Adel Farhan Halasa et al. | |

It is certified that error appears in the above-identified patent and that said Letters Patent is hereby corrected as shown below:

Column 6, line approximately 25, change "...styrenelbutadiene..." to ---styrene/butadiene---

Column 6, line approximately 27, change "...styrene/isoprenelbutadiene..."
to ---styrene/isoprene/butadiene---

Column 6, line approximately 28, change "...isoprenelbutadiene..." to ---isoprene/butadiene---

Signed and Sealed this
Twenty-eighth Day of February, 2012

David J. Kappos
*Director of the United States Patent and Trademark Office*